US008391497B2

(12) United States Patent
Zhang et al.

(10) Patent No.: US 8,391,497 B2
(45) Date of Patent: Mar. 5, 2013

(54) METHOD FOR IMPORTING RIGHTS OBJECT AND RIGHTS ISSUER

(75) Inventors: Renzhou Zhang, Shenzhen (CN); Chen Huang, Shenzhen (CN); Pei Dang, Shenzhen (CN); Haojun Zhou, Shenzhen (CN); Weizhong Yuan, Shenzhen (CN); Zhipeng Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 305 days.

(21) Appl. No.: 12/774,987

(22) Filed: May 6, 2010

(65) Prior Publication Data

US 2010/0215181 A1 Aug. 26, 2010

Related U.S. Application Data

(63) Continuation of application No. PCT/CN2008/072955, filed on Nov. 5, 2008.

(30) Foreign Application Priority Data

Nov. 7, 2007 (CN) .......................... 2007 1 0124296
Nov. 30, 2007 (CN) .......................... 2007 1 0196364

(51) Int. Cl.
H04L 9/08 (2006.01)

(52) U.S. Cl. .................... 380/282; 380/278; 705/51

(58) Field of Classification Search .......... 380/259–266, 380/277–279, 282; 705/71; 713/171; 726/1–36
See application file for complete search history.

(56) References Cited

U.S. PATENT DOCUMENTS

| 7,039,615 | B1 | 5/2006 | Gajjala et al. | |
|---|---|---|---|---|
| 7,617,158 | B2 * | 11/2009 | Bjorkengren et al. | 705/51 |
| 2003/0221099 | A1 * | 11/2003 | Medvinsky et al. | 713/153 |
| 2007/0038576 | A1 * | 2/2007 | Lee | 705/59 |
| 2007/0157318 | A1 | 7/2007 | Lee et al. | |
| 2008/0046271 | A1 * | 2/2008 | Jeong et al. | 705/1 |
| 2008/0047006 | A1 * | 2/2008 | Jeong et al. | 726/21 |
| 2008/0060053 | A1 * | 3/2008 | Kang et al. | 726/2 |
| 2008/0114687 | A1 * | 5/2008 | Watanabe et al. | 705/51 |
| 2008/0310637 | A1 * | 12/2008 | Li et al. | 380/278 |

FOREIGN PATENT DOCUMENTS

| CN | 1728039 A | 2/2006 |
|---|---|---|
| CN | 1852128 A | 10/2006 |

OTHER PUBLICATIONS

International Search Report from P.R. China in International Application No. PCT/CN2008/072955 mailed Feb. 5, 2009.
First Chinese Office Action dated (mailed) Nov. 12, 2010, issued in related Chinese Application No. 200710196364.1 Huawei Technologies Co., Ltd.
Written Opinion of the International Searching Authority (translation) dated (mailed) Feb. 5, 2009, issued in related Application No. PCT/CN2008/072955, filed Nov. 5, 2008, Huawei Technologies Co., Ltd.

* cited by examiner

*Primary Examiner* — Christopher Brown
*Assistant Examiner* — Fahimeh Mohammadi

(57) ABSTRACT

A method for importing or moving a rights object (RO) is provided, which includes the following steps. A rights issuer (RI) receives a request message of importing or moving an RO to a target device, the request message including key information encapsulated by a public key of the target device; the RI generates the RO according to the request message, the RO including the key information encapsulated by the public key of the target device; and the RI provides the RO for the target device. An RI is also provided. In the present invention, the key information encapsulated by the public key of the target device is provided for the RI, and the real key is hidden from the RI, such that the un-trust RI cannot generate the illegal RO for other devices except the target device, thereby enhancing the security of importing or moving the RO through the RI.

14 Claims, 2 Drawing Sheets

METHOD FOR IMPORTING RIGHTS OBJECT AND RIGHTS ISSUER

CROSS-REFERENCE TO RELATED APPLICATIONS

This application is a continuation of International Application No. PCT/CN2008/072955, filed on Nov. 5, 2008, which claims priority to Chinese Patent Application No. 200710124296.8, filed on Nov. 7, 2007 and Chinese Patent Application No. 200710196364.1, filed on Nov. 30, 2007, all of which are hereby incorporated by reference in their entireties.

FIELD OF THE TECHNOLOGY

The present invention relates to the field of digital rights management (DRM), and more particularly to a method for importing a rights object (RO), a device, and a rights issuer (RI).

BACKGROUND OF THE INVENTION

The DRM mainly controls the use of digital content through a permission control and content protection scheme, so as to protect legal rights of a content owner. A digital content issuer (CI) encrypts the digital content with a content encryption key (CEK), and packages the encrypted digital content into a content data packet. An RI distributes an RO corresponding to the digital content, which includes the encrypted CEK and corresponding permissions and constraints. As long as a DRM Agent owns both the content data packet and the RO, the DRM Agent can consume the purchased digital content according to the permissions and constraints in the RO.

Currently, encapsulation formats of the contents and the ROs of different DRM systems are varied, such that the DRM device cannot directly consume the contents and the ROs of the other DRM systems. In secure content exchange (SCE) defined by Open Mobile Alliance (OMA) standard organization, in order to enable the DRM device defined by the OMA to consume the contents and the ROs obtained through the other DRM systems, a local rights manager (LRM) is introduced to import the contents and the ROs of the other DRM systems to the OMA system. The LRM may import the RO for the SCE domain and the SCE device, and the LRM directly generates and provides the RO for the SCE device. Alternatively, the LRM may import the RO for the OMA DRM2.0 domain and the OMA DRM2.0 device, and as the OMA DRM2.0 device cannot identify the LRM, the LRM needs to generate the imported RO through the RI.

Referring to FIG. 1, the system includes an RI, an LRM, and an OMA DRM2.0 device. When the LRM imports the RO for the OMA DRM2.0 device, a process including the following steps is implemented.

1. The LRM registers with the RI. The LRM receives data of other DRM systems, and converts contents of other DRM formats into a content format (Packetized) DRM content format ((P)DCF) defined by the OMA.

2. The LRM requests the RI to generate an RO according to the data of the other DRM systems. The LRM and the RI exchange an ID of the OMA DRM2.0 device as well as permissions and constraints, key information, and other information (for example, RightsIssuerURL, SilentURLs, and other metadata) in the RO. The RI creates the RO according to the above information, and returns the RO to the LRM.

3. The LRM transmits the (P)DCF to the device, for example, in a super-distribution mode. The device requests and obtains the RO from the RI through a silent header in the (P)DCF.

The inventors find in the above process that, the RI obtains the key information, and thus the un-trust RI can continuously generate the illegal RO with the key information.

Similarly, in the circumstance that the SCE device moves the RO generated by the LRM through the RI, the un-trust RI may generate the illegal RO after obtaining the key information due to the same reason.

SUMMARY OF THE INVENTION

Accordingly, the present invention is directed to a method for importing an RO and an RI, such that the un-trust RI cannot generate the illegal RO for other devices except the target device, thereby enhancing the security of importing the RO.

In an embodiment, the present invention provides a method for importing an RO, which includes the following steps. An RI receives a request message of generating an RO, in which the request message includes key information encapsulated by a public key of a target device. The RI generates the RO according to the request message, in which the RO includes the key information encapsulated by the public key of the target device. The RI provides the RO for the target device.

Correspondingly, in an embodiment, the present invention provides an RI, which includes a receiving module, a generating module, and a sending module. The receiving module is adapted to receive a request message of generating an RO, in which the request message includes key information encapsulated by a public key of a target device. The generating module is adapted to generate the RO according to the request message, in which the RO includes the key information encapsulated by the public key of the target device. The sending module is adapted to provide the RO for the target device.

In an embodiment, the present invention further provides a method for importing or moving an RO, which includes the following steps. A request message of importing or moving an RO to a target device is generated, in which the request message includes key information encapsulated by a public key of the target device. The request message is sent to an RI.

Correspondingly, in an embodiment, the present invention further provides a device, which includes a generating module and a sending module. The generating module is adapted to generate a request message of importing or moving an RO to a target device, in which the request message includes key information encapsulated by a public key of the target device. The sending module is adapted to send the request message to an RI.

According to the embodiments of the present invention, the key information encapsulated by the public key of the target device is provided for the RI, and the real key is hidden from the RI, thereby enhancing the security of importing or moving the RO through the RI.

DETAILED DESCRIPTION OF THE EMBODIMENTS

In order to enable persons skilled in the art to better understand the present invention, the present invention is further described in detail below with the accompanying drawings.

Figure 1:
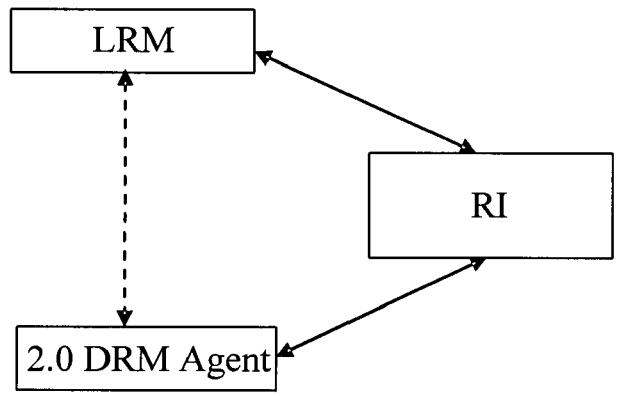
FIG. 1 is a schematic structural view of a DRM system in the prior art.
Figure 2:
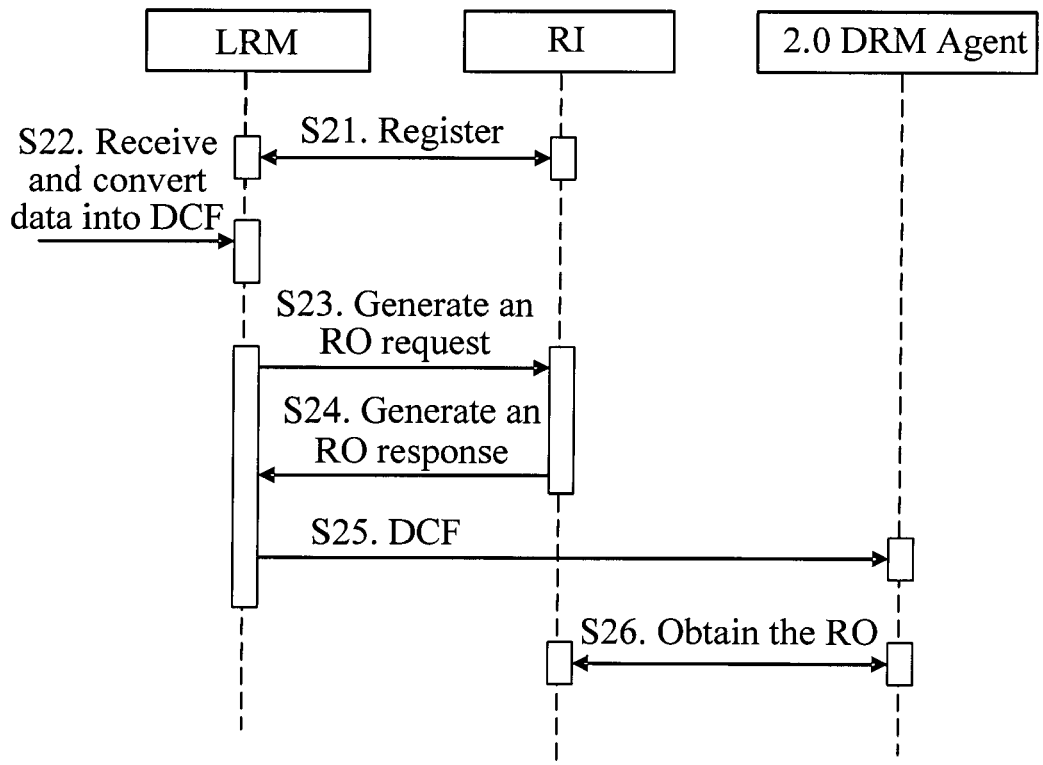
FIG. 2 is a schematic flow chart of importing an RO for a device by an LRM through an RI according to an embodiment of the present invention.

In the present invention, key information encapsulated by a public key of a target device is provided for an RI, and the real key is hidden from the RI, such that the RI is prevented from generating an illegal RO for other devices except the target device by using the key information, thereby enhancing the security of importing the RO through the RI. Particularly, referring to FIG. 2, a method for importing an RO for an OMA DRM2.0 device by an LRM through an RI includes the following steps.

In S21, the LRM registers with the RI.

In S22, the LRM receives data of other DRM systems, and converts contents of other DRM formats into a (P)DCF.

In S23, the LRM sends a CreateRORequest message to the RI, so as to request the RI to generate the imported RO, in which the message includes parameters as shown in Table 1.

TABLE 1

| Device ID | ID of the target device to be bound with the RO |
| Content ID | ID of the content associated with the RO |
| DCF Hash | Hash of the content |
| Permission & Constraint | Permission and constraint of accessing the content by the target device |
| Encrypted CEK | CEK encapsulated by REK |
| Encrypted (REK\|KMAC) | Concatenated value of the REK and the MAC KEY encapsulated by a public key of the target device |
| KMAC | MAC KEY; for seek of security, the MAC KEY may be transmitted after being encrypted, for example, the MAC KEY is encrypted by a public key of the RI, or by a communication key negotiated by the LRM with the RI |

In order to ensure the integrity of the message, the LRM may sign on the message.

Here, the encapsulation of the concatenated value of the REK and the MAC KEY by the public key of the target device may be directly encrypting the concatenated value of the REK and the MAC KEY by the public key of the target device. Optionally, a random number is encapsulated by the public key of the target device, and the concatenated value of the REK and the MAC KEY is encapsulated with the random number. In this case, the Encrypted (REK|KMAC) must include the encapsulated random number and the concatenated value of the REK and the MAC KEY encapsulated with the random number. Alternatively, other encapsulation methods may also be applied to enable only the target device to obtain the REK and the MAC KEY according to the Encrypted (REK|KMAC). For example, the process of encapsulating the concatenated value of the REK and the MAC KEY by the public key of the target device in the OMA DRM specifically includes the following steps.

1) A random number Z is generated by using a modulus m in the public key of the target device as a value reference range.

2) KEK=KDF(I2OSP(Z, mLen), NULL, kekLen) is generated, in which mLen is the length of the modulus m in octets while m is the public key of the target device, and kekLen is the length of a key (in octets) output by KDF and has a fixed value of 16 as defined by the OMA; KDF is a key derivation function, and a function of I2OSP is to convert an integer into a string of the length of mLen.

3) C2=AES-WRAP(KEK, KMAC|KREK) is generated, which is a result of encrypting the concatenated value of KMAC and KREK with the key KEK by using a symmetric encryption algorithm.

4) C1=I2OSP(RSA.ENC(pubKdev,Z), mLen) is generated, in which pubKdev is a public key of a receiver, and RSA.ENC is an asymmetric encryption function.

5) C=C1|C2 is generated, and is sent to the RI as the Encrypted (REK|KMAC) parameter in the message.

If the RO includes the permissions of a plurality of DCFs, Content ID, DCF Hash, Permission & Constraint, and Encrypted CEK may occur several times. The LRM may send the partially encapsulated RO to the RI.

In S24, the RI saves the information for creating the RO, and returns an RO generation response CreateROresponse message to the LRM. The RI generates the RO for the target device according to the information, then respectively fills the information received from the LRM to corresponding elements of the RO, which includes Content ID, DCF Hash, Permission & Constraint, Encrypted CEK, Device ID, and Encrypted (REK|KMAC), performs an integrity protection on a part of the information (including the key information and permission information) in the RO by using the KMAC, and puts an obtained MAC value in the RO. The RI adds the ID of itself in the RO, and optionally, signs on the RO or the message of delivering the RO, such that for the target device, the RO is completely generated by the RI, thereby maintaining the compatibility.

During the procedure, the RI cannot obtain the REK and the CEK in the plain text according to the KMAC and the Encrypted (REK|KMAC), such that the RI cannot generate the illegal RO for other devices.

In S25, the LRM transmits the (P)DCF to the device, for example, in a super-distribution mode defined in the OMA DRM2.0.

In S26, the device requests the RO from the RI through a silent header in the (P)DCF, and the RI returns the corresponding RO to the device. If the device does not register with the RI or the registration expires, the device needs to register with the RI before obtaining the RO.

After receiving the RO, the target device obtains the REK and the KMAC through decryption by using a private key of the device, performs an integrity validation on the RO by using the KMAC, obtains the CEK by decrypting the Encrypted CEK with the REK, and decrypts the content by using the CEK and consumes the content according to the permission and constraint information in the RO.

The REK in the RO may be separately encapsulated by the public key of the target device, instead of being encapsulated after being connected with the KMAC. In this case, the LRM provides the REK information encapsulated by the public key of the target device for the RI, that is, the Encrypted (REK). The KMAC may be selected by the RI.

The CEK in the RO may also be directly encapsulated by the public key of the device. Thereby, the LRM provides the CEK information encapsulated by the public key of the target device for the RI, so as to prevent the RI from generating the illegal RO for other devices.

Particularly, the CreateRORequest message includes parameters as shown in Table 2.

TABLE 2

| | |
|---|---|
| Device ID | ID of the target device to be bound with the RO |
| Content ID | ID of the content associated with the RO |
| DCF Hash | Hash of the content |
| Permission & Constraint | Permission and constraint of accessing the content by the target device |
| Encrypted CEK | CEK encapsulated by the public key of the target device |

The RI generates the RO for the target device according to the information, and provides the RO for the target device.

Optionally, the LRM provides encapsulated RO integrity protection key information for the RI, that is, the CreateRORequest message includes the Encrypted (CEK|KMAC).

Figure 3:
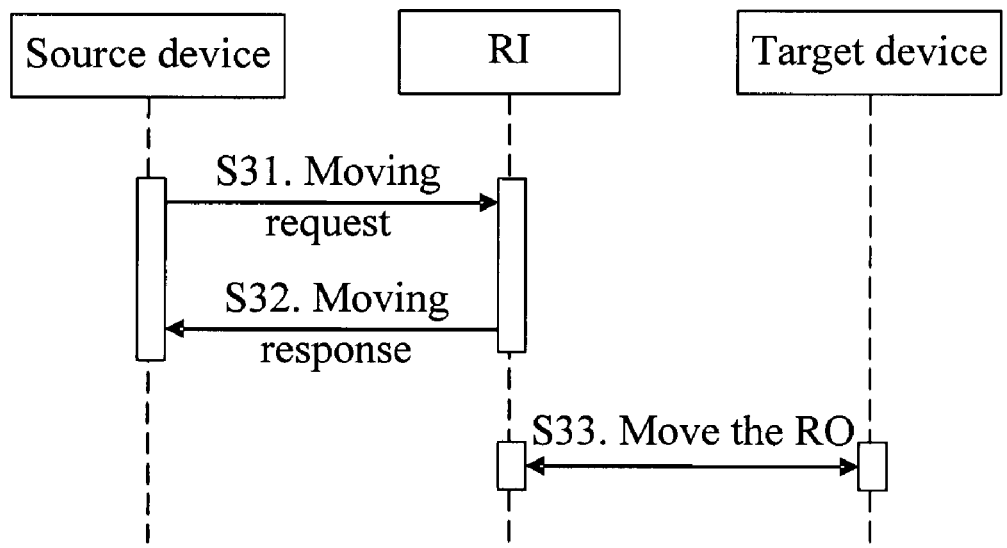
FIG. 3 is a schematic flow chart of moving an imported RO between devices through an RI according to an embodiment of the present invention.

Referring to FIG. 3, the process that the RO imported by the LRM is moved between the devices through the RI includes the following steps.

In S31, a source device sends a moving request MoveLRMRightsRequest message to the RI, so as to request the RI to move the RO imported by the LRM. The message includes parameters as shown in Table 3.

TABLE 3

| | |
|---|---|
| Device ID | ID of the target device |
| RO Info | (P)DCF information, the corresponding permission, and other information in the RO |
| State Info | State information, representing the permission of moving to the target device |
| Encrypted REK|KMAC | REK and MAC KEY encapsulated by the public key of the target device |
| KMAC | MAC KEY; for seek of security, the MAC KEY may be transmitted after being encrypted, for example, the MAC KEY is encrypted by a public key of the RI, or by a communication key negotiated by the LRM with the RI |

In S32, the RI returns a moving response message to the source device.

In S33, the RI generates the RO for the target device according to the request message, performs an integrity protection on the RO by using the KMAC, then puts an obtained MAC value in the RO, and delivers the RO to the device.

After receiving the RO, the target device obtains the REK and the KMAC through decryption by using the private key of the device, performs an integrity validation on the RO by using the KMAC, obtains the CEK by decrypting the Encrypted CEK with the REK, and decrypts the content by using the CEK and consumes the content according to the permission and constraint information in the RO.

In the OMA DRM, the RO Info may be a <rights> part of the original RO.

Alternatively, the source device provides the CEK information encapsulated by the public key of the target device for the RI, so as to prevent the RI from generating the illegal RO for other devices.

Figure 4:
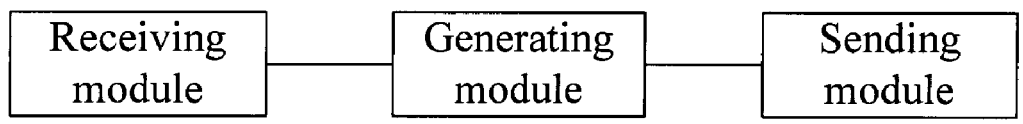
FIG. 4 is a schematic structural view of an RI according to an embodiment of the present invention.

Correspondingly, in an embodiment, referring to FIG. 4, the present invention provides an RI, which includes a receiving module, a generating module, and a sending module.

The receiving module is adapted to receive a request message of generating an RO, in which the request message includes key information encapsulated by a public key of a target device.

The generating module is adapted to generate the RO according to the request message, in which the RO includes the key information encapsulated by the public key of the target device.

The sending module is adapted to provide the RO for the target device.

The key information includes an REK or a CEK. The key information further includes an integrity protection key Kmac for RO.

Figure 5:
FIG. 5 is a schematic structural view of a device according to an embodiment of the present invention.

In an embodiment, referring to FIG. 5, the present invention provides a device, which includes a generating module and a sending module.

The generating module is adapted to generate a request message of importing or moving an RO to a target device, in which the request message includes key information encapsulated by a public key of the target device.

The sending module is adapted to send the request message to the RI.

The key information includes an REK or a CEK. The key information further includes an integrity protection key Kmac for RO.

Persons of ordinary skill in the art should understand that all or a part of the steps in the method according to the embodiments of the present invention can be implemented by a program instructing relevant hardware, and the program may be stored in a computer readable storage medium. When the program is run, the steps of the method according to the embodiments of the present invention are performed. The storage medium includes a ROM/RAM, a magnetic disk, or an optical disk.

According to the method and the RI of the present invention, the key information encapsulated by the public key of the target device is provided for the RI, and the real key is hidden from the RI, thereby enhancing the security of importing or moving the RO through the RI.

It is apparent that those skilled in the art can make various modifications and variations to the invention without departing from the spirit and scope of the invention. The invention shall cover the modifications and variations provided that they fall in the scope of protection defined by the following claims or their equivalents.

What is claimed is:

1. A method for a rights issuer to provide rights to a target device for the target device to use a content according to the rights, comprising:
    receiving, by the rights issuer from a requesting device, a request message requesting the rights issuer to provide a rights object to the target device, the request message containing key information encapsulated by a public key of the target device; wherein the key information is to be used by the target device to decrypt the content;
    generating, by the rights issuer, the rights object according to the request message, wherein the rights object contains rights for the target device to use the content and includes the key information encapsulated by the public key of the target device as taken from the request message; and
    sending, by the rights issuer, the rights object to the target device.

2. The method according to claim 1, wherein the key information comprises a rights encryption key (REK).

3. The method according to claim 2, wherein the key information further comprises an integrity protection key Kmac for the rights object.

4. The method according to claim 3, wherein the request message further comprises the integrity protection key Kmac for the rights object.

5. The method according to claim 4, wherein the integrity protection key Kmac for the rights object is encapsulated by a public key of the rights issuer.

6. The method according to claim 2, wherein the request message further comprises a content encryption key (CEK) encrypted with the REK, and the generated RO comprises the encrypted CEK.

7. The method according to claim 1, wherein the key information comprises a CEK.

8. The method according to claim 1, wherein the requesting device is a local rights manager, and the local rights manager requests the rights issuer to import the RO to the target device.

9. The method according to claim 1, wherein the requesting device is a source device, and the request message requests the rights issuer to move rights from the source device to the target device.

10. A method for a rights issuer to provide rights to a target device for the target device to use a content according to the rights, comprising:
   receiving, by the rights issuer from a requesting device, a request message requesting the rights issuer to provide a rights object to the target device, the request message containing key information encapsulated by a public key of the target device, wherein the key information is to be used by the target device to decrypt the content;
   generating, by the rights issuer, the rights object according to the request message, wherein the rights object contains rights for the target device to use the content and includes the key information encapsulated by the public key of the target device as taken from the request message; and
   sending, by the rights issuer, the rights object to the target device,
   wherein the key information comprises a rights encryption key (REK) and an integrity protection key Kmac for the rights object, and wherein the rights issuer performs an integrity protection on permission information and the key information of the rights object according to the Kmac, and provides an obtained MAC value for the target device together with the rights object.

11. A method for a rights issuer to provide rights to a target device for the target device to use a content according to the rights, comprising:
   receiving, by the rights issuer from a requesting device, a request message requesting the rights issuer to provide a rights object to the target device, the request message containing key information encapsulated by a public key of the target device, wherein the key information is to be used by the target device to decrypt the content;
   generating, by the rights issuer, the rights object according to the request message, wherein the rights object contains rights for the target device to use the content and includes the key information encapsulated by the public key of the target device as taken from the request message; and
   sending, by the rights issuer, the rights object to the target device,
   wherein the encapsulation of the key information by the public key of the target device comprises: encapsulating a random number by the public key of the target device, and encapsulating the key information with the random number.

12. A rights issuer for providing rights to a target device for the target device to use a content according to the rights, comprising:
   a receiving module, adapted to receive a request message from a requesting device requesting the rights issuer to provide a rights object to the target device, the request message containing key information encapsulated by a public key of the target device; wherein the key information is to be used by the target device to decrypt the content;
   a generating module, adapted to generate the rights object according to the request message, wherein the rights object contains rights for the target device to use the content and includes the key information encapsulated by the public key of the target device as taken from the request message; and
   a sending module, adapted to send the rights object to the target device.

13. The rights issuer according to claim 12, wherein the key information comprises a rights encryption key or a content encryption key.

14. The rights issuer according to claim 13, wherein the key information further comprises an integrity protection key Kmac for the rights object.

* * * * *